(12) United States Patent
Lichti et al.

(10) Patent No.: US 11,052,754 B2
(45) Date of Patent: Jul. 6, 2021

(54) FUEL TANK

(71) Applicant: Yachiyo Industry Co., Ltd., Saitama (JP)

(72) Inventors: Alan Lichti, Columbus, OH (US); Matthew Maples, Columbus, OH (US)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 16/221,496

(22) Filed: Dec. 15, 2018

(65) Prior Publication Data
US 2020/0189384 A1    Jun. 18, 2020

(51) Int. Cl.
*B60K 15/03* (2006.01)
*B29C 51/12* (2006.01)
*B29L 31/00* (2006.01)

(52) U.S. Cl.
CPC ........ *B60K 15/03177* (2013.01); *B29C 51/12* (2013.01); *B29L 2031/7172* (2013.01); *B60K 2015/03032* (2013.01); *B60K 2015/03453* (2013.01)

(58) Field of Classification Search
CPC ...... B65D 1/42; B60K 15/067; B60K 15/073; B60K 15/077; B60K 2015/03453; B60K 15/03177; B60K 2015/03032; B29C 51/12; B29L 2031/7172
See application file for complete search history.

(56) References Cited

U.S. PATENT DOCUMENTS

| | | | | |
|---|---|---|---|---|
| 2,860,809 A * | 11/1958 | Perry | ................... | B65D 90/52 220/563 |
| 4,858,778 A * | 8/1989 | Patrick | ................... | B64D 37/04 220/562 |
| 6,338,420 B1 | 1/2002 | Pachciarz et al. | | |
| 8,636,162 B2 * | 1/2014 | Schoen | ................... | B60K 15/03 220/4.14 |
| 9,493,068 B2 * | 11/2016 | Li | ................... | B60K 15/077 |
| 10,099,549 B2 * | 10/2018 | Gebert | ................... | B29C 49/20 |
| 10,259,316 B2 * | 4/2019 | Lee | ................... | B60K 15/03 |
| 2002/0066737 A1 * | 6/2002 | Stack | ................... | B60K 15/077 220/564 |

FOREIGN PATENT DOCUMENTS

| | | |
|---|---|---|
| DE | 102016217135 A1 * | 3/2018 |
| JP | H0732381 | 6/1995 |
| JP | 2008082391 | 4/2008 |
| JP | 2018-039413 | 3/2018 |
| JP | 2018-127123 | 8/2018 |
| JP | 2018-014292 | 1/2019 |
| JP | 2019-014292 | 1/2019 |

OTHER PUBLICATIONS

Written Opinion of the International Preliminary Examining Authority, dated Dec. 1, 2020.

* cited by examiner

*Primary Examiner* — Don M Anderson
(74) *Attorney, Agent, or Firm* — Steven M. Greenberg, Esq.; Shutts & Bowen LLP

(57) ABSTRACT

A fuel tank made of a resin includes: a tank body having walls facing each other therein; and an internal strut including both ends fixed to the facing walls respectively. The internal strut has a grid shape such that through holes are arranged as viewed from a side.

7 Claims, 6 Drawing Sheets

FUEL TANK

BACKGROUND OF THE INVENTION

Field of the Invention

The present invention relates to a resinous fuel tank.

Description of the Related Art

As a resinous fuel tank, a technique for supporting walls that face each other in a tank body with an internal strut is known. In a fuel tank, walls of the tank body can deform toward outside or inside the fuel tank due to internal pressure variation. At this time, if the internal strut has no elasticity, stress tends to concentrate on welded parts between the tank body and the internal strut. In some cases, there is a risk that the welded parts crack or a risk that the internal strut buckles.

To solve this problem, U.S. Pat. No. 6,338,420 describes a technique for providing an internal strut with a lobe that elastically deforms easily. According to this technique, when walls of a tank body deform toward outside or inside a fuel tank, the lobe flexes to absorb the amount of deformation of the tank body. This reduces concentration of stress on the welded parts.

BRIEF SUMMARY OF THE INVENTION

Meanwhile, in a case where a portion that elastically deforms easily is provided in some part, there is a problem that the strut tends to lack rigidity. Therefore, an internal strut that has high-level elasticity and rigidity at the same time in a balanced manner is demanded.

According to a first aspect of the present invention, a fuel tank made of a resin includes: a tank body that has walls facing each other therein; and an internal strut including both ends fixed to the facing walls respectively. The internal strut has a grid shape such that through holes are arranged as viewed from a side.

According to a second aspect, the through holes are hexagonal holes.

According to a third aspect, the internal strut has circular welding faces welded to the walls on both ends of the internal strut respectively having a substantially cylindrical shape.

According to a fourth aspect, the internal strut is two or more internal struts and the fuel tank further includes a coupling part coupling neighboring internal struts to each other.

According to a fifth aspect, the coupling part is located away from both ends of the internal struts.

According to a sixth aspect, the coupling part has coupling through holes extending therethrough in the same direction as the through holes extend, and the coupling through holes are arranged side by side in axial directions of the internal struts.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
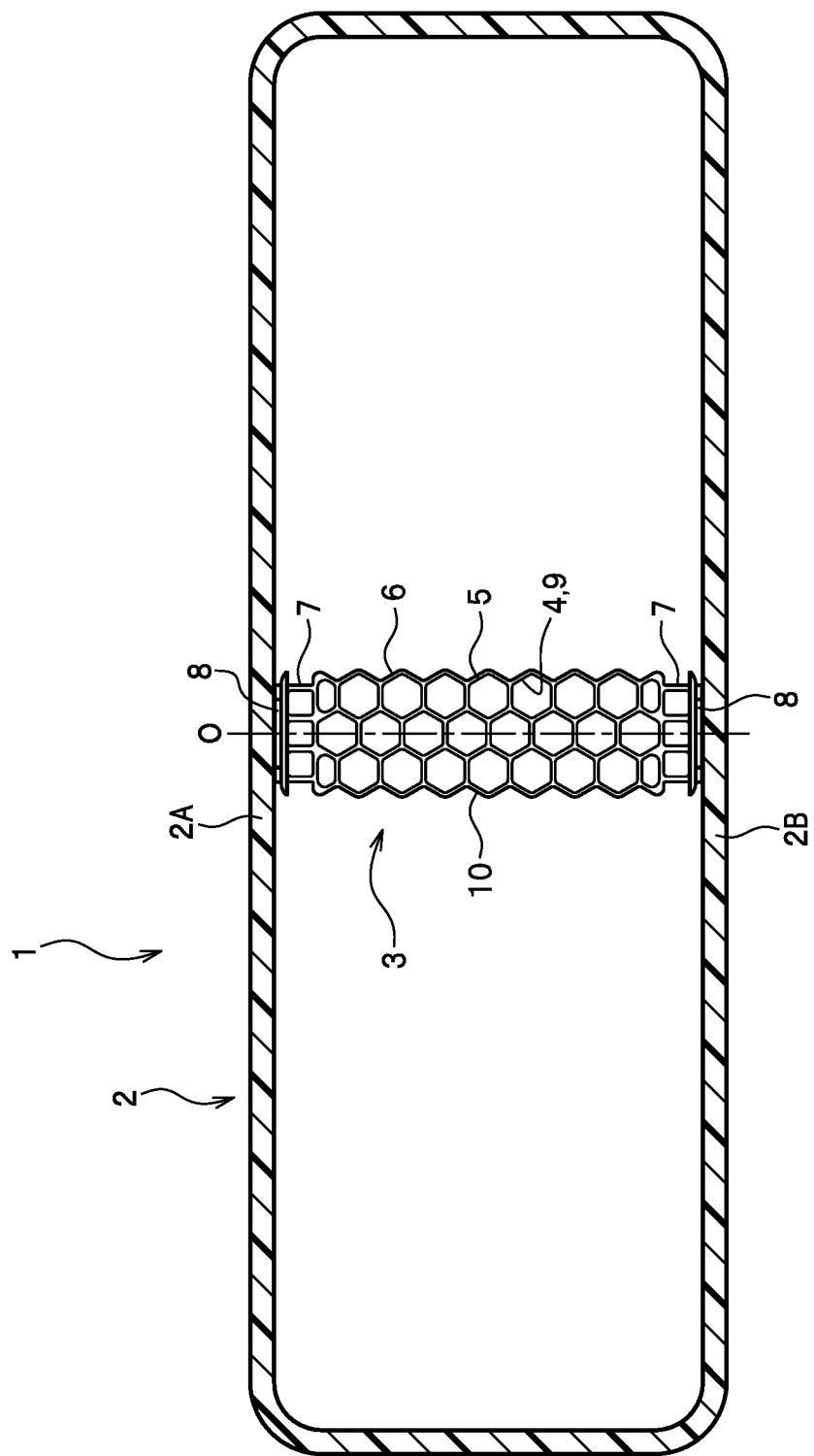
FIG. 1 is a side sectional view of a fuel tank according to the present invention.

As illustrated in FIG. 1, a fuel tank 1 includes an internal strut 3 that has both ends respectively fixed to walls 2A and 2B facing each other inside a resinous tank body 2. The tank body 2 has a layer structure which includes, for example, a multi-layer sectional structure including a barrier layer made of a material highly impermeable to a fuel interposed between an inside thermoplastic resin layer forming the inner surface of the tank and an outside thermoplastic resin layer forming the outer surface of the tank. The inside thermoplastic resin layer and the outside thermoplastic resin layer are made of materials, for example, PE (high-density polyethylene) having high thermofusibility and high moldability. The both ends of the internal strut 3 are thermally welded to the inside thermoplastic resin layer of the walls 2A and 2B.

Figure 2:
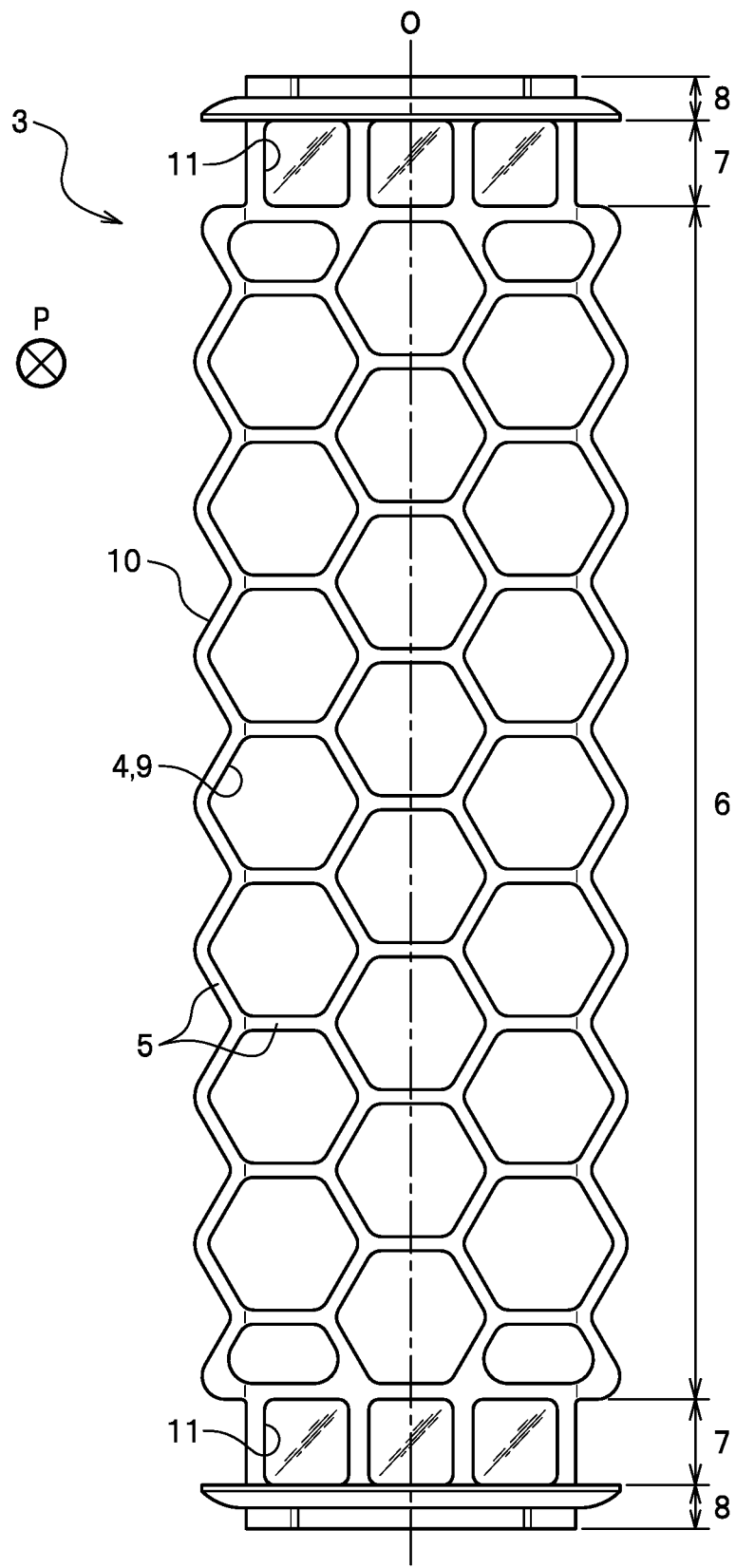
FIG. 2 is a side view of an internal strut according to a first embodiment.
Figure 3:
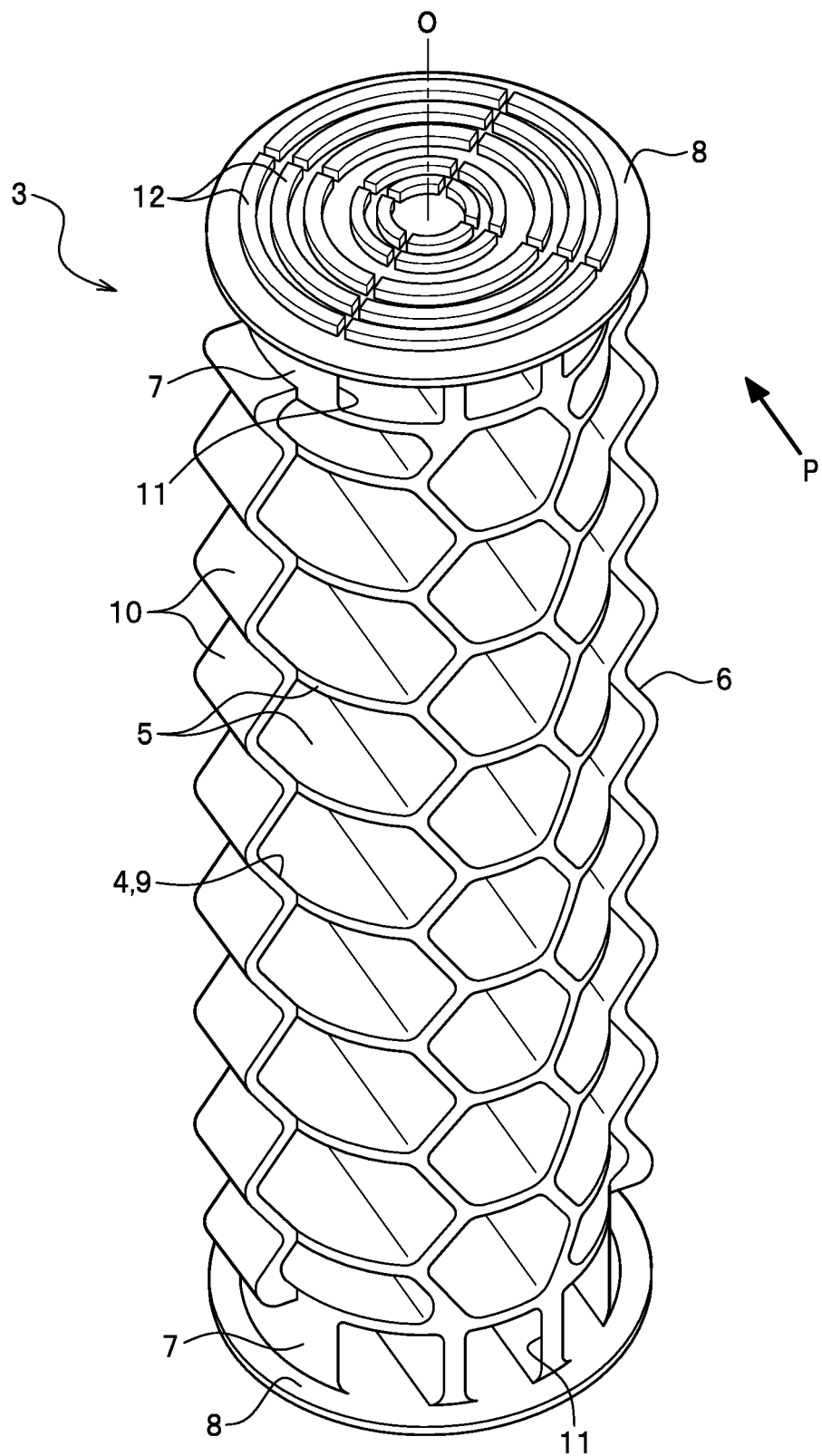
FIG. 3 is an external perspective view of the internal strut according to the first embodiment.

With reference also to FIGS. 2 and 3, the internal strut 3 has a grid shape in which through holes 4 are arranged as viewed from the side (in a direction P orthogonal to the direction of an axis O of the internal strut 3). The internal strut 3 in the grid shape increases the rigidity of the internal strut 3 as compared to the conventional structure including an elastic portion provided in some part. For example, if an internal pressure variation in the tank body 2 causes a tensile or compressive stress to be applied to the internal strut 3 from the walls 2A and 2B in the direction of the axis O, a grid wall 5 around each of the through holes 4 flexes in the direction of the axis O. This elastically deforms the internal strut 3 in the direction of the axis O without occurrence of excessive stress concentration on it. That is, the internal strut 3 according to the present invention ensures both the elasticity and the rigidity in a balanced manner and reduces the stress concentration on welded parts between the tank body 2 and the internal strut 3. Further, flexing of the internal strut 3 also reduces the risk of the buckling of the internal strut 3.

Preferred embodiments of the internal strut 3 are described below.

First Embodiment

In FIGS. 1 to 3, the internal strut 3 includes a strut central part 6 having the through holes 4 provided thereon, and welding face parts 8 formed on both the ends of the strut central part 6 with strut end parts 7 interposed therebetween, respectively, and has a substantially cylindrical shape as a whole. The internal strut 3 is made of a resin and the strut central part 6, the strut end parts 7, and the welding face parts 8 are molded integrally.

The through holes 4 are hexagonal holes 9. That is, the strut central part 6 of the internal strut 3 has a honeycomb structure. The hexagonal holes 9 are arranged in three lines extending in the direction of the axis O. The grid wall 5 near the circumferential surface of the strut central part 6 is formed as accordion-like planes 10. Meanwhile, a part of each of the hexagonal holes 9 around an opening end is formed like an arc in a circumferential direction around the axis O as can be seen from FIG. 3. Accordingly, the strut central part 6 has a substantially cylindrical shape as a whole.

The welding face parts 8 are formed as a circular plate. The welding face parts 8 have arc ribs 12 formed thereon concentrically on the axis O. The arc ribs 12 each located on the same circumferential line are formed with cuts. Provision of these arc ribs 12 enables resin of the tank body 2 to come around the arc ribs 12 during thermal welding and therefore improves the weldability between the tank body 2 and the internal strut 3.

According to the present embodiment, the through holes 4 are the hexagonal holes 9 and accordingly the internal strut 3 has a honeycomb structure. Therefore, both high rigidity and excellent elasticity of the internal strut 3 are provided. The internal strut 3 in a substantially cylindrical shape, having the circular welding face parts 8 on the both ends, respectively, enables the load applied to the welded parts or the internal strut 3 to be transmitted uniformly around the axis O. This construction reduces excessive stress concentration on the internal strut 3.

Second Embodiment

Figure 4:
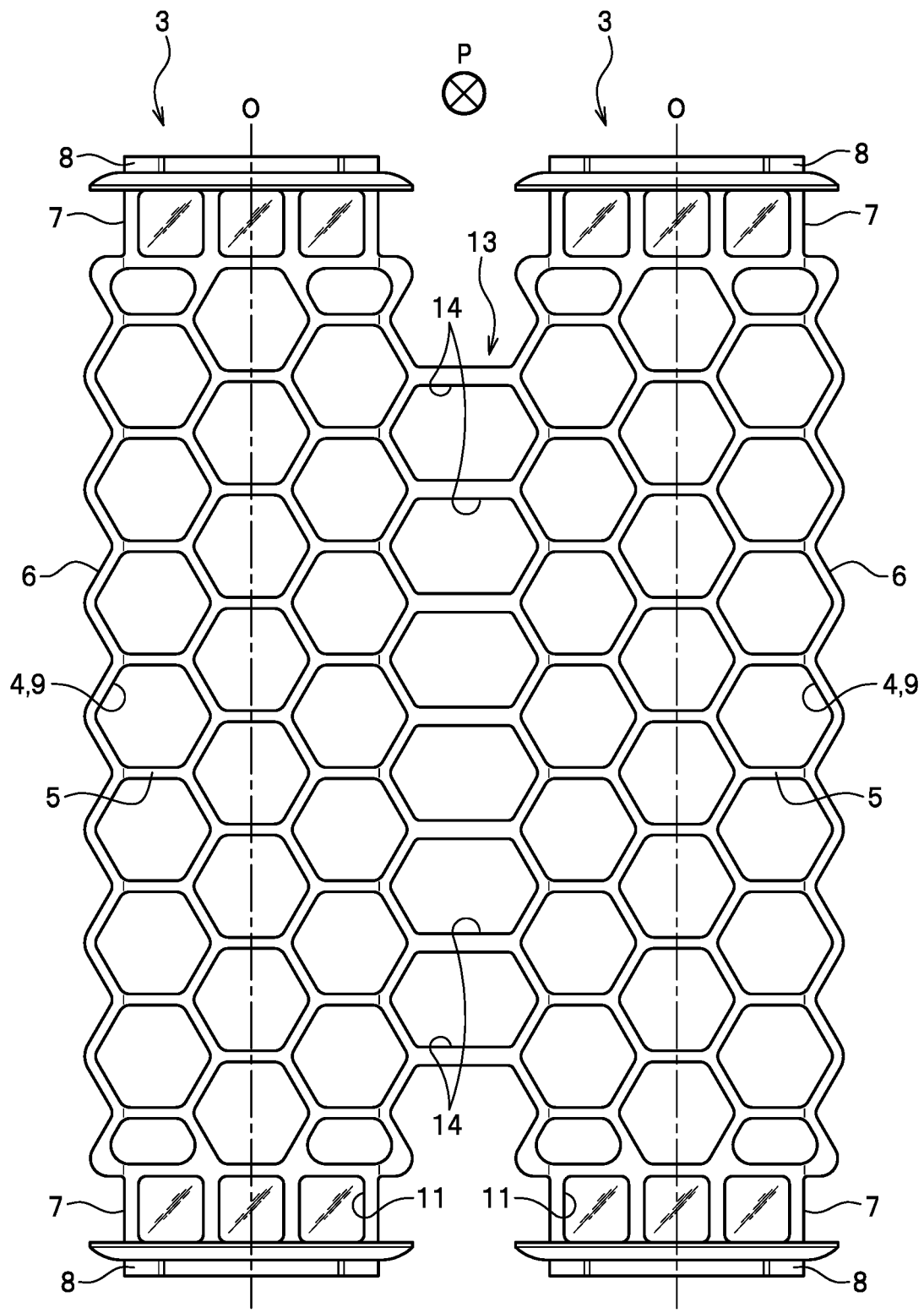
FIG. 4 is a side view of internal struts according to a second embodiment.
Figure 5:
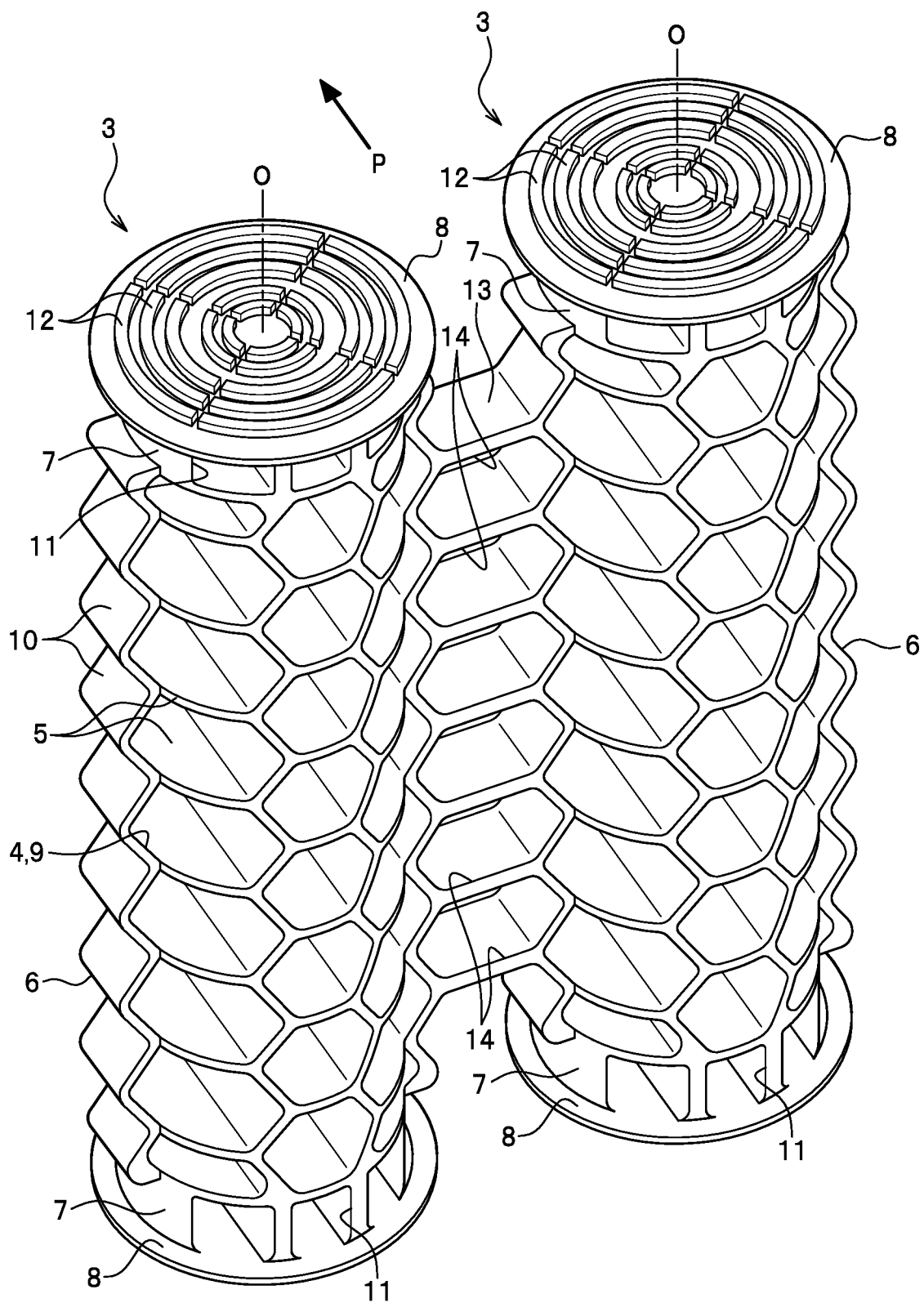
FIG. 5 is an external perspective view of the internal struts according to the second embodiment.

In a second embodiment, two internal struts 3 are coupled with a coupling part 13 as illustrated in FIGS. 4 and 5. Each of the internal struts 3 has the same construction as that in the first embodiment, and descriptions thereof are omitted. The coupling part 13 is provided at a midpoint of the internal struts 3 away from the both ends of the internal struts 3, specifically, on the strut central parts 6. The coupling part 13 is formed of rectangular plate-like parts as viewed in the direction of the axis O, which couples the planes 10 of the respective internal struts 3 to each other. The plate-like parts are placed to be spaced in the direction of the axis O. Accordingly, the coupling part 13 has hexagonal coupling through holes 14 extending therethrough in the same direction as the hexagonal holes 9 extend, that is, in the direction P and being arranged side by side in the directions of the axes O of the internal struts 3.

If an excessive force is applied on one of the internal struts 3, the coupling part 13 coupling the internal struts 3 to each other makes the excessive force transmitted to the other internal strut 3 through the coupling part 13. With the coupling part 13 provided at a midpoint of the internal struts 3 away from the both ends of the internal struts 3, the coupling part 13 is placed at a region being highly elastic due to the grid shape and stress concentration on the coupling part 13 is reduced. Further, because the coupling part 13 includes the coupling through holes 14 extending therethrough in the same direction as the hexagonal holes 9 and being arranged side by side in the directions of the axes O of the internal struts 3, the elasticity of the coupling part 13 itself is ensured and the coupling part 13 is expanded and contracted according to expanding and contracting motions of the internal struts 3. This construction further reduces the stress concentration around the coupling part 13.

Figure 6:
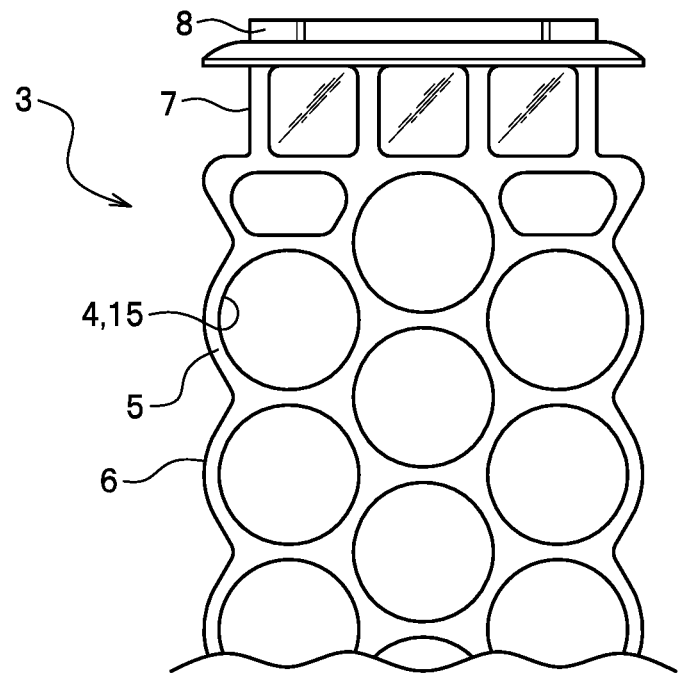
FIG. 6 is a side view of an internal strut having circular holes as through holes.
Figure 7:
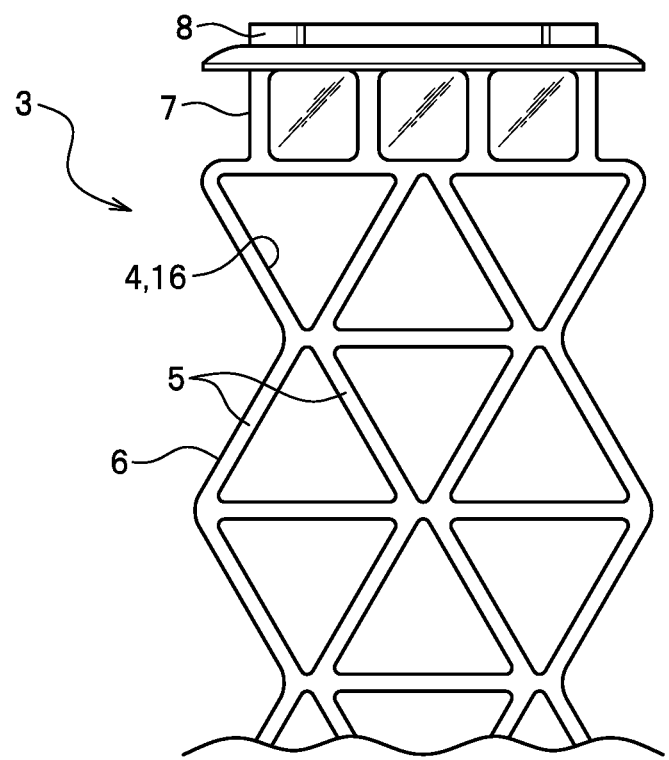
FIG. 7 is a side view of an internal strut having triangular holes as through holes.

Preferred embodiments of the present invention have been described above. The through holes 4 are not limited to the hexagonal holes 9 and may be circular holes 15 illustrated in FIG. 6, triangular holes 16 illustrated in FIG. 7, or the like as long as these holes are arranged in a grid.

In the second embodiment, it is permissible to provide three or more internal struts 3.

According to the first aspect of the present invention, an internal strut has a grid shape such that through holes are arranged as viewed from the side. Therefore, as compared to an internal strut partially including a portion that elastically deforms easily, the internal strut enhances in the rigidity. When walls of a tank body are deformed outward or inward due to internal pressure variation of the tank body and a tensile or compressive force is applied to the internal strut in the axis direction, the grid structure has a portion around each of the through holes flexed in the axis direction. This construction of the internal strut of the present invention ensures the elasticity and the rigidity in a balanced manner and reduces stress concentration on welded parts between the tank body and the internal strut.

According to the second aspect, the grid shape is a honeycomb shape and thus both high rigidity and excellent elasticity of the internal strut are achieved.

According to the third aspect, when the internal strut is formed in a substantially cylindrical shape having circular welding face parts on both ends thereof, respectively, the load applied to the welded parts or the internal strut is transmitted uniformly around the axis. This construction reduces excessive stress concentration on the internal strut.

According to the fourth aspect, the coupling part that couples the internal struts to each other is provided, and if an excessive force is applied to one of the internal struts, the coupling part transmits the excessive force to the other internal strut through the coupling part.

According to the fifth aspect, the coupling part is provided at a region highly elastic due to the grid shape, and thus stress concentration on the coupling part is reduced.

According to the sixth aspect, the elasticity of the coupling part itself is ensured and the coupling part is expanded and contracted according to expanding and contracting motions of the internal struts. This construction further reduces the stress concentration on the coupling part.

According to the present invention, when the stress concentration on the welded parts between the tank body and the internal strut is reduced during deformation of the tank body, the elasticity and the rigidity of the internal strut is ensured in a balanced manner.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

We claim:

1. A fuel tank made of a resin comprising:
    a tank body having walls facing each other therein;
    an internal strut extending between the facing walls in an axial direction of the internal strut and including opposite axial ends fixed to the facing walls respectively;

wherein the internal strut includes a honeycomb structure which has adjacent through holes arranged in a grid shape in the axial direction of the internal strut as viewed from a side, and wherein the adjacent through holes extend through the internal strut from a side of the internal strut to an opposite side to the side of the internal strut in a direction orthogonal to the axial direction of the internal strut.

2. The fuel tank according to claim 1,
wherein the adjacent through holes are hexagonal holes.

3. A fuel tank, made of a resin comprising:
a tank body having walls facing each other therein;
an internal strut including opposite ends fixed to the facing walls respectively;
wherein the internal strut includes a honeycomb structure which has adjacent through holes arranged in a grid shape as viewed from a side,
wherein the internal strut further has a substantially cylindrical shape having circular welding faces welded to the walls on the opposite ends of the internal strut respectively, and
wherein the adjacent through holes extend through the internal strut from a side of the internal strut to an opposite side to the side of the internal strut.

4. The fuel tank according to claim 1,
wherein the internal strut comprises two or more internal struts,
the fuel tank further comprising a coupling part coupling neighboring internal struts to each other,
wherein the coupling part has a structure which has adjacent coupling through holes arranged in a grid shape as viewed from a side, and
wherein the adjacent coupling through holes are arranged in a grid shape together with the adjacent through holes and extend through the coupling part from a side of the coupling part to the opposite side in the same direction as the adjacent through holes extend.

5. The fuel tank according to claim 4,
wherein coupling part is located away from both ends of the internal struts.

6. The fuel tank according to claim 3,
wherein the internal strut comprises two or more internal struts,
the fuel tank further comprising a coupling part coupling neighboring internal struts to each other,
wherein the coupling part has a honeycomb structure which has adjacent coupling through holes arranged in a grid shape as viewed from a side, and
wherein the adjacent coupling through holes are arranged in a grid shape together with the adjacent through holes and extend through the coupling part from a side of the coupling part to the opposite side in the same direction as the adjacent through holes extend.

7. The fuel tank according to claim 6, wherein coupling part is located away from both ends of the internal struts.

* * * * *